(12) United States Patent
Liang et al.

(10) Patent No.: US 10,088,599 B2
(45) Date of Patent: Oct. 2, 2018

(54) SYSTEMS AND METHODS FOR WEATHER FORECASTING

(71) Applicant: Tencent Technology (Shenzhen) Company Limited, Shenzhen (CN)

(72) Inventors: Jingbiao Liang, Shenzhen (CN); Chu Zeng, Shenzhen (CN); Junhao Fan, Shenzhen (CN); Huanyi Zheng, Shenzhen (CN); Cheng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 451 days.

(21) Appl. No.: 14/620,559

(22) Filed: Feb. 12, 2015

(65) Prior Publication Data

US 2015/0160372 A1 Jun. 11, 2015

Related U.S. Application Data

(63) Continuation of application No. PCT/CN2014/083735, filed on Aug. 5, 2014.

(30) Foreign Application Priority Data

Aug. 16, 2013 (CN) .......................... 2013 1 0359483

(51) Int. Cl.
*H04W 4/02* (2018.01)
*G01D 7/00* (2006.01)
(Continued)

(52) U.S. Cl.
CPC ................ *G01W 1/00* (2013.01); *G01D 7/00* (2013.01); *G01W 1/10* (2013.01); *H04W 4/02* (2013.01); *G01W 2001/006* (2013.01)

(58) Field of Classification Search
CPC .................................. G01D 1/00; G01D 7/00
See application file for complete search history.

(56) References Cited

U.S. PATENT DOCUMENTS 8,914,045 B2 * 12/2014 Luo .......................... H04W 4/02
455/414.2
9,451,030 B2 * 9/2016 Schunder ............... G07C 5/008
(Continued)

FOREIGN PATENT DOCUMENTS

CN 1481512 A 3/2004
CN 101518119 A 8/2009
(Continued)

OTHER PUBLICATIONS

Dash et al.,"A Survey on Applications of Wireless Sensor Network Using Cloud Computing", International Journal of Science & EMrging Technologies, vol. 1, Issue 4, Dec. 2010, pp. 50-55.*
(Continued)

*Primary Examiner* — Evan Pert
(74) *Attorney, Agent, or Firm* — Anova Law Group, PLLC

(57) ABSTRACT

Systems, terminals, servers and methods are provided for weather forecasting. For example, one or more first terminals acquire environmental information corresponding to the first terminals; wherein the environmental information includes geographic location information of the first terminals and weather data corresponding to the geographic location information; the first terminals transmit the environmental information to a server so that the server acquires weather forecasting information of an area corresponding to one or more geographic locations of the first terminals based on at least information associated with the weather data corresponding to the first terminals; wherein the geographic locations corresponding to the first terminals are within the
(Continued)

area; and the first terminals acquire the weather forecasting information of the area transmitted by the server.

22 Claims, 13 Drawing Sheets

(51) Int. Cl.
  *G01W 1/00* (2006.01)
  *G01W 1/10* (2006.01)

(56) References Cited

U.S. PATENT DOCUMENTS

| | | | |
|---|---|---|---|
| 2004/0064450 | A1 | 4/2004 | Hatano et al. |
| 2008/0076450 | A1* | 3/2008 | Nanda .................. G01D 21/00 455/456.1 |

FOREIGN PATENT DOCUMENTS

| | | |
|---|---|---|
| CN | 201508421 U | 6/2010 |
| CN | 102169194 A | 8/2011 |
| CN | 102238154 A | 11/2011 |
| CN | 102590896 A | 7/2012 |
| CN | 102682495 A | 9/2012 |
| CN | 102821351 A | 12/2012 |

OTHER PUBLICATIONS

Toledano et al., "Long-Range Wireless Mesh Network for Weather Monitoring in Unfriendly Geographic Conditions", Sensors 11, Jul. 2011, pp. 7141-7161.*
Hartley, "The Internet of Things—Weather Monitoring too", date unknown, 16 pages.*
Yawut, "A wireless sensor network for weather and disaster alarm systems", 2011 International Conference on Information and Electronics Engineering IPCSIT vol. 6 (2011), IACSIT Press, Singapore, Dec. 2011, pp. 155-159.*
Merz, "Weather crowdsourcing app could track passing of single clouds—Researchers have developed a smartphone app to crowdsource weather conditions in unprecedented detail", Telegraph, Aug. 15, 2013, 2 pages.*
Patent Cooperation Treaty, International Preliminary Report on Patentability, PCT/CN2014/083735, dated Feb. 16, 2016.
Patent Cooperation Treaty, International Search Report & Written Opinion of the International Searching Authority, PCT/CN2014/083735, dated Nov. 13, 2014.
Chinese Patent Office, Office Action dated Sep. 5, 2017, in Application No. 201310359483.X.

* cited by examiner

SYSTEMS AND METHODS FOR WEATHER FORECASTING

CROSS-REFERENCES TO RELATED APPLICATIONS

This application is a continuation of International Application No. PCT/CN2014/083735, with an international filing date of Aug. 5, 2014, now pending, which claims priority to Chinese Patent Application No. 201310359483.X, filed Aug. 16, 2013, both applications being incorporated by reference herein for all purposes.

BACKGROUND OF THE INVENTION

Certain embodiments of the present invention are directed to computer technology. More particularly, some embodiments of the invention provide systems and methods for weather forecasting. Merely by way of example, some embodiments of the invention have been applied to terminals and/or servers. But it would be recognized that the invention has a much broader range of applicability.

Weather forecasting technology develops meteorological technology. Usually, weather forecasting may be performed based on weather data acquired using large equipment, such as satellites, radars, etc. In addition, weather forecasting may be performed according to weather data acquired by professional data collectors in real time. The conventional technology has some disadvantages.

For example, the weather data acquired using the large equipment, such as satellites, radars, etc. are weather data of a macroscopic scope that often has large granularity. That is, the weather data of a local region may not be accurately acquired. In addition, the large equipment usually has a slow feedback rate of the weather data and is poor in timeliness. Thus, such large equipment may not be used for weather forecasting in real time. Also, a lot of initial investment, high maintenance costs, and/or significant manpower may be needed.

In another example, real time collection by professional data collectors may need significant manpower. In addition, this approach often relies on the professionalism of the data collectors. Acquisition of weather data of a macroscopic scope is usually difficult to achieve, and the coverage rate is often low.

Hence it is highly desirable to improve the techniques for weather forecasting.

BRIEF SUMMARY OF THE INVENTION

According to one embodiment, a method is provided for weather forecasting. For example, one or more first terminals acquire environmental information corresponding to the first terminals; wherein the environmental information includes geographic location information of the first terminals and weather data corresponding to the geographic location information; the first terminals transmit the environmental information to a server so that the server acquires weather forecasting information of an area corresponding to one or more geographic locations of the first terminals based on at least information associated with the weather data corresponding to the first terminals; wherein the geographic locations corresponding to the first terminals are within the area; and the first terminals acquire the weather forecasting information of the area transmitted by the server.

According to another embodiment, a method is provided for weather forecasting. For example, a server receives environmental information corresponding to one or more first terminals; wherein the environmental information includes geographic location information of the first terminals and weather data corresponding to the geographic location information; the server acquires weather forecasting information of an area corresponding to one or more geographic locations of the first terminals based on at least information associated with the weather data corresponding to the first terminals; wherein the geographic locations corresponding to the first terminals are within the area; and the server transmits the weather forecasting information of the area to the first terminals.

According to yet another embodiment, a method is provided for weather forecasting. For example, one or more second terminals receive a weather query instruction including first geographic location information; and the second terminals transmit a weather query request to a server so that the server provides weather forecasting information to the second terminals, the weather forecasting information being acquired according to weather data of one or more first terminals; and the second terminals display the weather forecasting information to a user upon receiving the weather forecasting information transmitted by the server. The weather query request includes the first geographic location information. Second geographic location information of the second terminals and third geographic location information of the first terminals are within an area.

In one embodiment, a terminal includes: an environmental information acquisition module configured to acquire environmental information corresponding to the terminal; wherein the environmental information includes geographic location information of the terminal and weather data corresponding to the geographic location information; an environmental information transmission module configured to transmit the environmental information to a server so that the server acquires weather forecasting information of an area corresponding to a geographic location of the terminal based on at least information associated with the weather data corresponding to the terminal; wherein the geographic location corresponding to the terminal is within the area; and a weather forecasting information acquisition module configured to acquire the weather forecasting information of the area transmitted by the server.

In another embodiment, a server includes: an environmental information receiving module configured to receive environmental information corresponding to one or more first terminals; wherein the environmental information includes geographic location information of the first terminals and weather data corresponding to the geographic location information; a weather forecasting module configured to acquire weather forecasting information of an area corresponding to one or more geographic locations of the first terminals based on at least information associated with the weather data corresponding to the first terminals; wherein the geographic locations corresponding to the first terminals are within the area; and a forecasting information transmission module configured to transmit the weather forecasting information of the area to the first terminals.

In yet another embodiment, a terminal includes: a query instruction receiving module configured to receive a weather query instruction including first geographic location information; a query instruction transmission module configured to transmit a weather query request to a server so that the server provides weather forecasting information to the terminal, the weather forecasting information being acquired according to weather data of one or more first terminals; and a forecasting information display module configured to display the weather forecasting information to a user upon receiving the weather forecasting information transmitted by the server. The weather query request includes second geographic location information of the terminal and third geographic location information of the first terminals. The second geographic location information of the terminal and the third geographic location information of the first terminals are within an area.

According to one embodiment, a weather forecasting system includes: one or more first terminals; a server; and one or more second terminals. The first terminals are configured to acquire environmental information corresponding to the first terminals, transmit the environmental information to the server, and acquire the weather forecasting information of the area transmitted by the server, the environmental information including first geographic location information of the first terminals and weather data corresponding to the first geographic location information. The server is configured to receive the environmental information corresponding to the first terminals, acquire the weather forecasting information of the area corresponding to one or more geographic locations of the first terminals based on at least information associated with the weather data corresponding to the first terminals, and transmit the weather forecasting information of the area to the first terminals. The second terminals are configured to receive a weather query instruction including second geographic location information, transmit a weather query request to the server, and display the weather forecasting information to a user upon receiving the weather forecasting information transmitted by the server, the weather query request including the second geographic location information.

According to another embodiment, a non-transitory computer readable storage medium includes programming instructions for weather forecasting. The programming instructions are configured to cause one or more data processors to execute certain operations. For example, one or more first terminals acquire environmental information corresponding to the first terminals; wherein the environmental information includes geographic location information of the first terminals and weather data corresponding to the geographic location information; the first terminals transmit the environmental information to a server so that the server acquires weather forecasting information of an area corresponding to one or more geographic locations of the first terminals based on at least information associated with the weather data corresponding to the first terminals; wherein the geographic locations corresponding to the first terminals are within the area; and the first terminals acquire the weather forecasting information of the area transmitted by the server.

According to yet another embodiment, a non-transitory computer readable storage medium includes programming instructions for weather forecasting. The programming instructions are configured to cause one or more data processors to execute certain operations. For example, a server receives environmental information corresponding to one or more first terminals; wherein the environmental information includes geographic location information of the first terminals and weather data corresponding to the geographic location information; the server acquires weather forecasting information of an area corresponding to one or more geographic locations of the first terminals based on at least information associated with the weather data corresponding to the first terminals; wherein the geographic locations corresponding to the first terminals are within the area; and the server transmits the weather forecasting information of the area to the first terminals.

According to yet another embodiment, a non-transitory computer readable storage medium includes programming instructions for weather forecasting. The programming instructions are configured to cause one or more data processors to execute certain operations. For example, one or more second terminals receive a weather query instruction including first geographic location information; and the second terminals transmit a weather query request to a server so that the server provides weather forecasting information to the second terminals, the weather forecasting information being acquired according to weather data of one or more first terminals; and the second terminals display the weather forecasting information to a user upon receiving the weather forecasting information transmitted by the server. The weather query request includes the first geographic location information. Second geographic location information of the second terminals and third geographic location information of the first terminals are within an area.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1A:
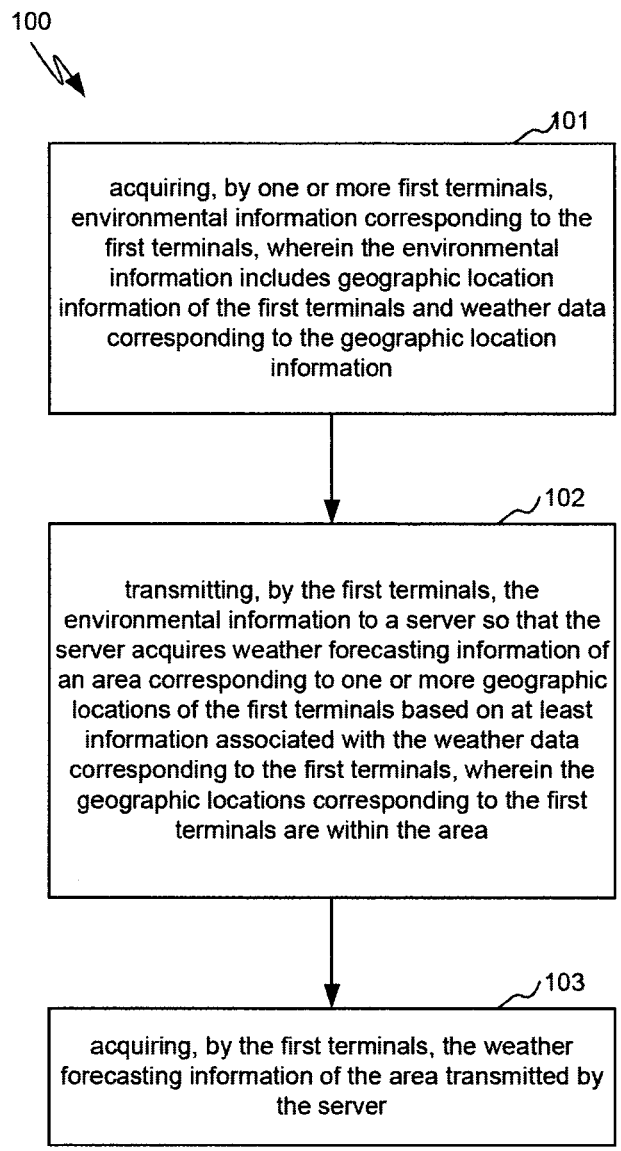
FIG. 1(A) is a simplified diagram showing a method for weather forecasting according to one embodiment of the present invention.

FIG. 1(A) is a simplified diagram showing a method for weather forecasting according to one embodiment of the present invention. The diagram is merely an example, which should not unduly limit the scope of the claims. One of ordinary skill in the art would recognize many variations, alternatives, and modifications. The method 100 includes at least processes 101-103. For example, the method 100 is performed by one or more terminals.

According to one embodiment, during the process 101, one or more first terminals acquire environmental information corresponding to the first terminals. For example, the environmental information includes geographic location information of the first terminals, and weather data corresponding to the geographic location information. In another example, the environmental information includes the weather data and the geographic location information. In yet another example, the environmental information further includes other information such as current measurement time and sound information of a surrounding environment. In yet another example, the weather data includes atmospheric temperature, atmospheric humidity and atmospheric particle concentration. In yet another example, the weather data further includes ultraviolet intensity, etc. In yet another example, the geographic location information includes: longitude and latitude coordinates, a name, etc. of the current geographic location.

According to another embodiment, during the process 102, the one or more first terminals transmit the environmental information to a server to enable the server to acquire weather forecasting information of an area within a designated scope corresponding to one or more geographic locations corresponding to the first terminals according to the received weather data corresponding to the first terminals. For example, the geographic locations corresponding to the first terminals are located in the area. In another example, the server is configured to process the weather data of a certain area. The particular scope of the area can be defined according to a city, an urban district or a street, according to some embodiments. Different servers can correspond to different areas, and can have a hierarchical relation according to coverage areas of the servers, according to certain embodiments. For example, an upper-level server can have a plurality of lower-level servers associated with the upper-level server, and the area of the upper-level server covers the areas corresponding to the lower-level servers. In another example, the transmission of the environmental information to the server includes: determining the server corresponding to the geographic location information according to the geographic location information, and transmitting the environmental information to the corresponding server. In yet another example, the area within the designated scope corresponding to the one or more geographic locations of the one or more first terminals are preset by the server, or defined by the server according to the received geographic location information of the first terminals. In yet another example, the geographic locations of the first terminals belong to the area.

According to yet another embodiment, the server can preset the area within the designated scope associated with the geographic locations of the first terminals, or define the area within the designated scope corresponding to the geographic locations according to the geographic locations corresponding to the first terminals after receiving the environmental information corresponding to the first terminals. For example, the area is defined according to geographic location distribution density of the first terminals. In another example, for the first terminals with a higher geographic location distribution density, the area within the designated scope corresponding to the geographic locations of the first terminals is defined by a smaller area radius. In yet another example, for the first terminals with a lower geographic location distribution density, the area within the designated scope corresponding to the geographic locations of the first terminals is defined by a larger area radius. In one embodiment, during the process 103, the first terminals acquire the weather forecasting information of the area transmitted by the server. For example, the method 100 is executed by a terminal configured to acquire the environmental information, as shown in FIG. 1(B).

Figure 1B:
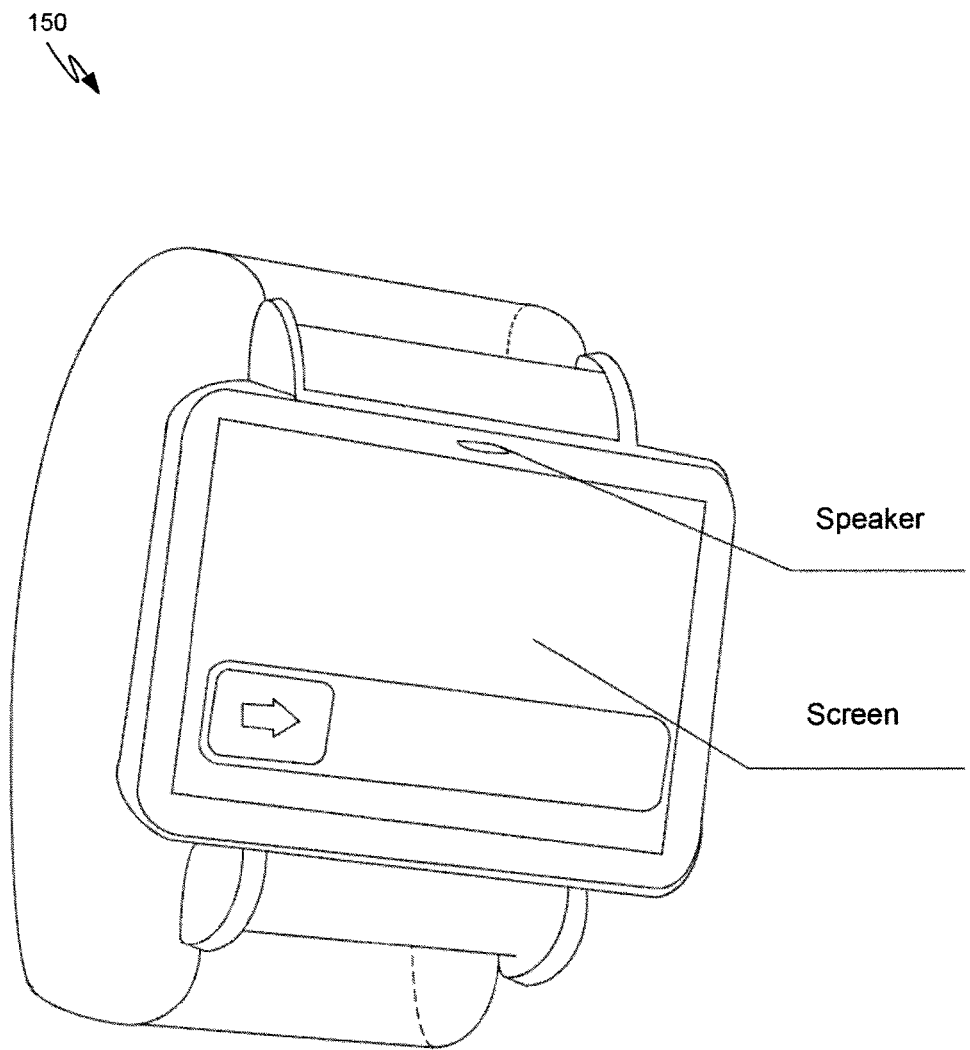
FIG. 1(B) is a simplified diagram showing a terminal for weather forecasting according to one embodiment of the present invention.

FIG. 1(B) is a simplified diagram showing a terminal for weather forecasting according to one embodiment of the present invention. The diagram is merely an example, which should not unduly limit the scope of the claims. One of ordinary skill in the art would recognize many variations, alternatives, and modifications. For example, the terminal 150 is located in a wearable device, such as a wristwatch, a wristband, etc.

Referring back to FIG. 1(A), the one or more first terminals distributed in various geographic locations acquire the environmental information of the geographic locations and transmit to the server, according to some embodiments. For example, the server can obtain the environmental information in different geographic locations within the same area in a crowd sourcing manner, and therefore determine the weather forecasting information of the areas corresponding to the geographic location information according to the weather data included in the environmental information of the geographic locations.

The method 100 adopts a crowd sourcing manner, according to certain embodiments. For example, the first terminals acquire the environmental information to share a task of acquiring the environmental information, so as to reduce labor costs for weather forecasting, apportion equipment cost, increase an acquisition coverage rate of the environmental information, and improve the timeliness of the weather forecasting, so that the weather forecasting accuracy rate is increased.

In one embodiment, the process 101 includes at least sub-processes 101a and 101b. For example, the sub-process 101a includes: acquiring the weather data using one or more sensors. In another example, the first terminals are configured with one or more sensors, and acquire the weather data using the one or more sensors. As an example, each of the sensors has corresponding weather data. In another example, the weather data corresponding to a temperature and humidity sensor includes atmospheric temperature and atmospheric humidity. In yet another example, the atmospheric temperature and the atmospheric humidity are acquired via the temperature and humidity sensor. In yet another example, atmospheric particle concentration is acquired via a particle sensor. In yet another example, ultraviolet intensity is acquired via an ultraviolet sensor.

In another embodiment, the sub-process 101b includes: applying a Global Positioning System (GPS) for positioning to acquire the geographic location information. For example, the GPS is applied to acquire longitude and latitude coordinates of a current geographic location as the geographic location information.

In yet another embodiment, after the process 101, the method 100 further includes at least a process 101c or a process 101d. For example, the process 101c includes: displaying the weather data. In another example, the first terminals are configured with a display screen, a loudspeaker, etc., and display the information via the display screen or broadcasts sound information via the loudspeaker to provide the weather data to a user. In yet another example, after the environmental information is acquired, the weather data is displayed on the display screen. In yet another example, corresponding text information, or corresponding image information, such as a meteorological chart, can be displayed when the weather data is provided. In yet another example, the geographic location information can be displayed on the display screen. In yet another example, text information of the longitude and latitude coordinates or a map labeled with the current geographic location, etc. are displayed.

In yet another embodiment, the process 101d includes: broadcasting voice data for prompting the weather data. For example, after acquiring the environmental information, the first terminals can identify the weather data, convert the weather data into the voice data for prompting the weather data, and broadcast the voice data for prompting the weather data via the loudspeaker.

According to one embodiment, after the process 103, the method 100 further includes: displaying the weather forecasting information, or broadcasting the voice data for prompting the weather data upon receiving the weather forecasting information. According to another embodiment, the process 102 includes at least a sub-process 102a or a sub-process 102b. As an example, the sub-process 102a includes: uploading the environmental information to the server. For example, the first terminals upload the environmental information to the server through a mobile network. As another example, the sub-process 102b includes: transmitting the environmental information to one or more second terminals through a data connection with the second terminals to enable the second terminals to transmit the environmental information to the server. For example, the first terminals enables a Bluetooth function, scans the second terminals near the first terminals, establishes a Bluetooth data connection with the scanned second terminals, and transmits the environmental information to the second terminals through the Bluetooth data connection to enable the second terminals to transmit the environmental information to the server. In another example, the first terminals enables a WIFI (Wireless Fidelity) function, establishes a WIFI data connection with the second terminals, and transmits the environmental information to the second terminals through the WIFI data connection to enable the second terminals to transmit the environmental information to the server.

In some embodiments, the first terminals can be integrated with the second terminals. For example, the first terminals saves Bluetooth data or WIFI data of the second terminals after acquiring the Bluetooth data or WIFI data for the first time, and automatically establishes the data connection with the second terminals without repeated Bluetooth scanning or WIFI access. In certain embodiments, the first terminals and the second terminals can be integrated into a single terminal, or can be two separate terminals. For example, the first terminals and the second terminals can establish a communication data connection for data communication. Particularly, the first terminals can directly transmit the information to the server, or transmit the information to the second terminals to enable the second terminals to transmit the information to the server. In another example, the server can directly transmit returned information to the first terminals or the second terminals, or transmit to the second terminals to enable the second terminals to forward the returned information to the first terminals according to the communication data connection.

According to one embodiment, the process 103 includes a sub-process 103a or a sub-process 103b. For example, the sub-process 103a includes: the first terminals acquires the weather forecasting information of the area transmitted to the first terminals by the server. The sub-process 103b includes: the first terminals acquires the weather forecasting information of the area transmitted by the server and forwarded by the second terminals. As an example, when acquiring the weather forecasting information of the area, the server can directly transmit the weather forecasting information to the first terminals, or transmit the weather forecasting information to the second terminals. As another example, after receiving the weather forecasting information of the area transmitted by the server, the second terminals can forward the weather forecasting information of the area to the first terminals. That is, the first terminals acquire the weather forecasting information of the area transmitted by the server and forwarded by the second terminals.

Figure 2A:
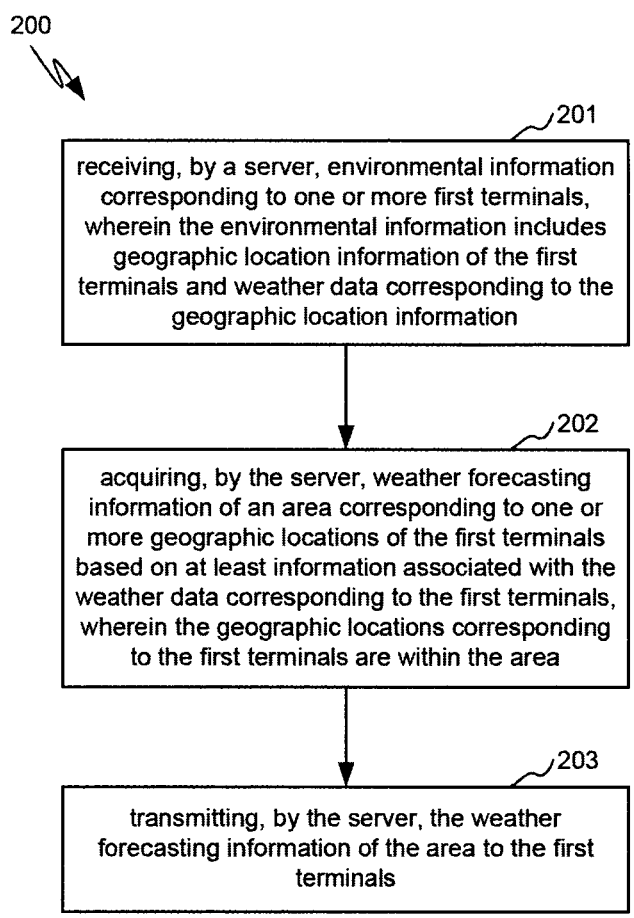
FIG. 2(A) is a simplified diagram showing a method for weather forecasting according to another embodiment of the present invention.

FIG. 2(A) is a simplified diagram showing a method for weather forecasting according to another embodiment of the present invention. The diagram is merely an example, which should not unduly limit the scope of the claims. One of ordinary skill in the art would recognize many variations, alternatives, and modifications. The method 200 includes at least processes 201-203. For example, the method 200 is performed by a server.

According to one embodiment, during the process 201, the server receives environmental information corresponding to one or more first terminals, wherein the environmental information includes geographic location information of the first terminals, and weather data corresponding to the geographic location information. For example, the server may be a single server, a server cluster, or a functional module on a server for processing the weather data. As an example, a geographic area is assigned to each server in the server cluster. That is, each server corresponds to one geographic area, and receives and processes the environmental information in the corresponding area.

According to another embodiment, during the process 202, the server acquires weather forecasting information of an area within a designated scope corresponding to one or more geographic locations corresponding to the one or more first terminals according to the weather data associated with the first terminals, and a preset weather forecasting algorithm, wherein the geographic locations corresponding to the first terminals are located in the area. For example, the server calculates according to the received weather data of the corresponding area and the preset weather forecasting algorithm, and acquires a calculation result as the weather forecasting information of the area corresponding to the geographic locations. As an example, the preset weather forecasting algorithm may be set by a technician, and may be changed by a user during use. In some embodiments, the geographic location information may correspond to an area with a smaller scope or an area with a larger scope. For example, the geographic location information is associated with a first area, and the first area corresponds to a first server and is within a second area that corresponds to a second server. In another example, the first server calculates according to the received weather data and the preset weather forecasting algorithm to acquire the weather forecasting information of the first area, and transmits the weather data to the second server to enable the second server to acquire the weather forecasting information of the second area according to the weather data transmitted by the first servers and the preset weather forecasting algorithm.

Figure 2B:
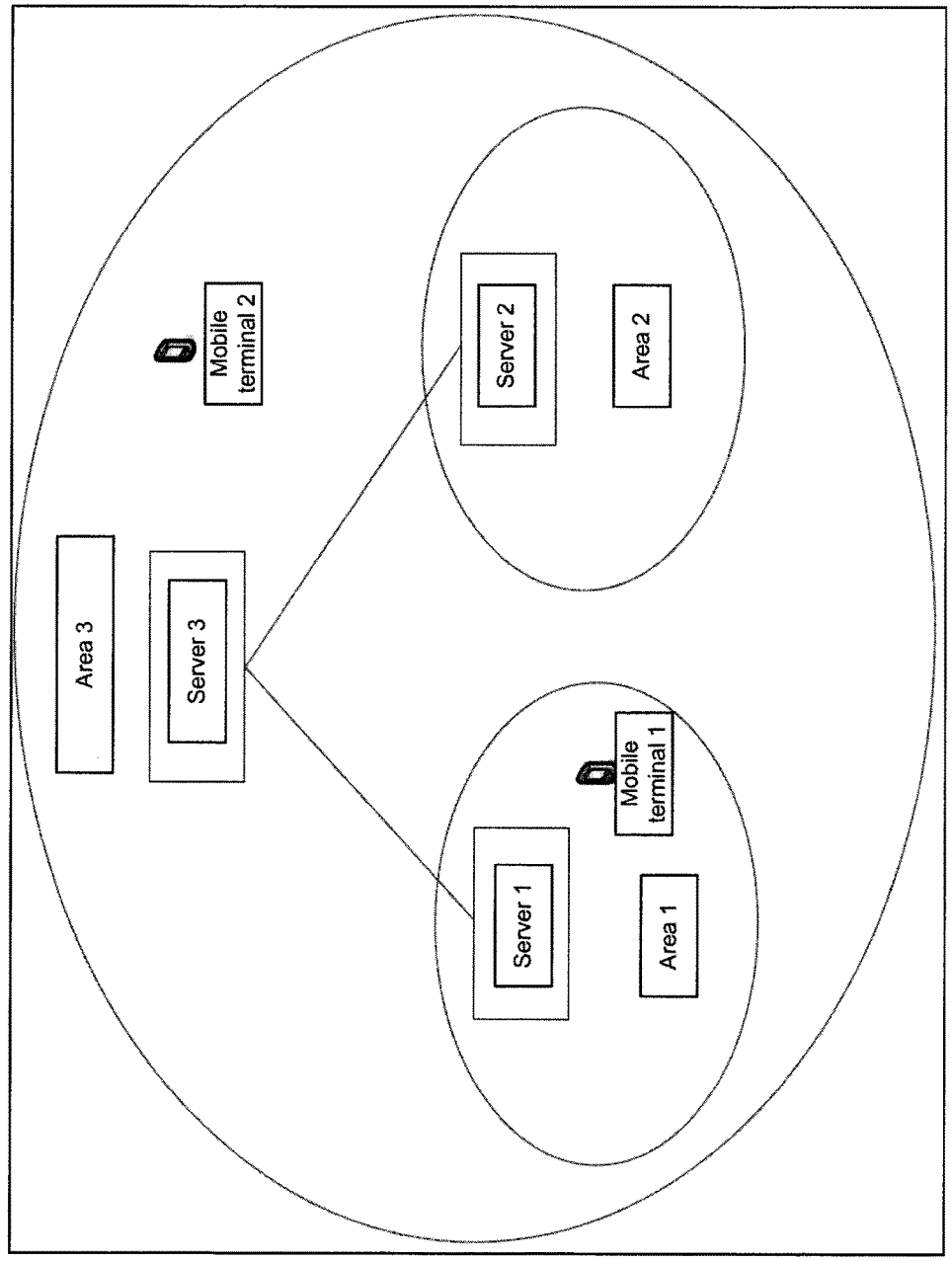
FIG. 2(B) is a simplified diagram showing an environment for weather forecasting according to one embodiment of the present invention.

FIG. 2(B) is a simplified diagram showing an environment for weather forecasting according to one embodiment of the present invention. The diagram is merely an example, which should not unduly limit the scope of the claims. One of ordinary skill in the art would recognize many variations, alternatives, and modifications.

As shown in FIG. 2(B), an area 1 corresponds to a server 1, an area 2 corresponds to a server 2, and an area 3 corresponds to a server 3, where the area 1 and the area 2 belong to the area 3, according to some embodiments. For example, the server 1 receives the environmental information in the area 1, acquires the weather forecasting information of the area 1 according to the received weather data and the preset weather forecasting algorithm and transmits the weather data of the area 1 to the server 3. In another example, the server 2 receives the environmental information in the area 2, acquires the weather forecasting information of the area 2 according to the received weather data and the preset weather forecasting algorithm, and transmits the weather data of the area 2 to the server 3. In yet another example, the server 3 acquires the weather forecasting information of the area 3 according to the received weather data transmitted by the servers in the area 3 and the preset weather forecasting algorithm.

According to certain embodiments, the weather forecasting information for the area corresponding to the geographic location information is acquired according to the weather data and the preset weather forecasting algorithm based on a weather need. For example, the weather need includes forecasting a time period, forecasting a weather type, forecasting an area, etc. In another example, the forecasted time period may be tomorrow, a week ahead, etc. In yet another example, the forecasted weather type may be atmospheric temperature, atmospheric humidity, ultraviolet intensity, etc. In yet another example, the forecasted area may be a city, an urban district, etc. In yet another example, the server may acquire the corresponding weather forecasting information according to various weather needs to facilitate displaying of the corresponding weather forecasting information to a user according to the needs of the user on the weather forecasting information in a subsequent process.

Referring back to FIG. 2(A), during the process 203, the server transmits the weather forecasting information of the area to the one or more first terminals, according to some embodiments. The method 200 adopts a crowd sourcing manner, according to certain embodiments. For example, the first terminals acquire the environmental information to share a task of acquiring the environmental information, so as to reduce labor costs for weather forecasting, apportion equipment cost, increase an acquisition coverage rate of the environmental information, and improve the timeliness of the weather forecasting, so that the weather forecasting accuracy rate is increased.

According to one embodiment, the process 201 includes: the server receives the environmental information corresponding to the one or more first terminals and forwarded by one or more second terminals. For example, the server may receive the environmental information forwarded by one or more mobile terminals. As an example, the first terminals acquires the environmental information, and transmits the environmental information to the one or more second terminals through the data connection with the second terminals, and the server receives the environmental information, namely the environmental information forwarded by the second terminals.

According to another embodiment, the process 203 includes: the server transmits the weather forecasting information of the area to the one or more first terminals corresponding to one or more terminal identifications according to a corresponding relation between the area and the terminal identifications. For example, the terminal identifications include a device number, a device chip serial number, etc. As an example, the corresponding devices may be the first terminals or other devices associated with the terminal identifications during subscription.

According to yet another embodiment, the server periodically transmits the weather forecasting information of the next cycle of the area to the devices corresponding to the terminal identifications according to the corresponding relation between the area and the terminal identifications. For example, before the process 203, the method 200 further includes: establishing the corresponding relation between the area and the terminal identifications. In another example, when the environmental information transmitted by the devices is received for the first time, the terminal identification of the devices and the geographic location information are acquired, the weather forecasting information of the area within a designated scope corresponding to the geographic locations corresponding to the devices are acquired, and the corresponding relation between the area corresponding to the geographic location information and the terminal identifications is established.

In one embodiment, after the process 202, the method 200 further includes: the server transmits the weather forecasting information to the one or more second terminals corresponding to one or more user identifications according to a corresponding relation between the area and the one or more user identifications. For example, the one or more user identifications include a phone number of a mobile terminal or an application identification, such as an instant messaging account or an interactive platform account. As an example, the server transmits the weather forecasting information of the next cycle of the area corresponding to the geographic location information to the second terminals corresponding to the one or more user identifications periodically according to the corresponding relation between the area and the one or more user identifications. As another example, when receiving a weather forecasting request transmitted by the second terminals, the server acquires the one or more user identifications of the second terminals, detects whether the server saves the corresponding relation between the area corresponding to the geographic location information and the one or more user identifications of the second terminals, and transmits the weather forecasting information of the area corresponding to the geographic location information to the second terminals if so.

In another embodiment, before the process 203, the method 200 further includes: establishing the corresponding relation between any area and the one or more user identifications of the second terminals when receiving a request of the second terminals to subscribe to weather of any area. For example, the server can receive the request transmitted by the second terminals in the corresponding area to subscribe to the weather of the area, and can also receive the request of the second terminals to subscribe to the weather of other areas beyond the area. Taking a first server and a third server for instance, the first server corresponds to the first area, the third server corresponds to the third area, and the first area and the third area do not overlap. As an example, when the first server receives the request of the second terminals in the first area to subscribe to the weather of the third area, the corresponding relation between the third area and the one or more user identifications of the second terminals can be established. As another example, when acquiring the weather forecasting information of the third area, the third server transmits to the first server, and the first server transmits the weather forecasting information of the third area to the second terminals according to the corresponding relation between the third area and the one or more user identifications of the second terminals.

Referring to FIG. 2(B), a mobile terminal 1 (e.g., the one or more second terminals) is located in the area 1, and a mobile terminal 2 (e.g., the one or more second terminals) is located in the area 3, according to certain embodiments. For example, when receiving the request of the mobile terminal 1 to subscribe to the weather of the area 1, the server 1 establishes the corresponding relation between the area 1 and the one or more user identifications of the mobile terminal 1, and transmits the weather forecasting information of the area 1 to the mobile terminal 1 according to the corresponding relation between the area 1 and the one or more user identifications of the mobile terminal 1 when receiving the weather forecasting information of the area 1. In another example, when receiving the request of the mobile terminal 1 to subscribe to the weather of the area 3, the server 3 establishes the corresponding relation between the area 3 and the one or more user identifications of the mobile terminal 1, and transmits the weather forecasting information of the area 3 to the mobile terminal 1 according to the corresponding relation between the area 3 and the one or more user identifications of the mobile terminal 1 when receiving the weather forecasting information of the area 3. In yet another example, when receiving the request of the mobile terminal 2 to subscribe to the weather of the area 1, the server 3 establishes the corresponding relation between the area 1 and the one or more user identifications of the mobile terminal 2. The server 1 transmits the weather forecasting information of the area 1 to the server 3 when receiving the weather forecasting information of the area 1, and the server 3 transmits the weather forecasting information of the area 1 to the mobile terminal 2 according to the corresponding relation between the area 1 and the one or more user identifications of the mobile terminal 2 when receiving the weather forecasting information of the area 1.

According to some embodiments, after the server transmits the weather forecasting information of the area to the second terminals corresponding to the one or more user identifications according to the corresponding relation between the area and the one or more user identifications, the second terminals may further transmit the weather forecasting information of the area to the first terminals to enable the first terminals to be capable of acquiring the weather forecasting information of the area forwarded by the second terminals.

Figure 3:
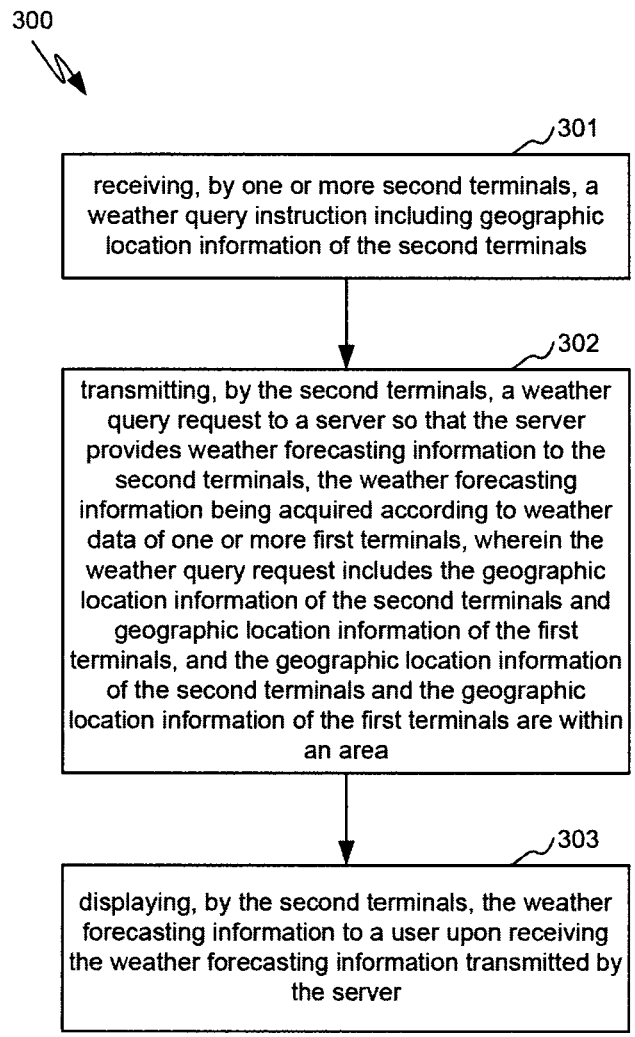
FIG. 3 is a simplified diagram showing a method for weather forecasting according to yet another embodiment of the present invention.

FIG. 3 is a simplified diagram showing a method for weather forecasting according to yet another embodiment of the present invention. The diagram is merely an example, which should not unduly limit the scope of the claims. One of ordinary skill in the art would recognize many variations, alternatives, and modifications. The method 300 includes at least processes 301-303.

According to one embodiment, during the process 301, one or more second terminals receive a weather query instruction which includes geographic location information. For example, the weather query instruction can be triggered by opening a weather application installed on the second terminals, or by a user clicking a key for inquiring into weather. As an example, the geographic location information of the second terminals can be acquired via a GPS when the weather application installed on the second terminals is opened, or input by the user. In another example, the geographic location information input by the user is acquired after clicking the key for inquiring the weather. In yet another example, the weather query instruction can include query time, such as a next day or a week ahead.

According to another embodiment, during the process 302, the second terminals transmit a weather query request to a server to enable the server to transmit weather forecasting information of an area within a designated scope corresponding to one or more geographic locations corresponding to the second terminals in weather forecasting information of an area within a designated scope corresponding to one or more geographic locations corresponding to one or more first terminals acquired by the server according to weather data corresponding to the first terminals and a preset weather forecasting algorithm to the second terminals, where the weather query request includes the geographic location information. For example, the weather query request may further include one or more user identifications of the second terminals to enable the server to return the weather forecasting information according to the one or more user identifications, and the weather query request may further includes a weather display manner applicable to the second terminals, such as a text or a meteorological chart, to enable the server to return the weather forecasting information consistent with the weather display manner.

According to certain embodiments, different servers have different coverage scopes. For example, when the weather forecasting information is requested from the servers, the weather query request is transmitted to a regional server corresponding to the geographic location information associated with a particular area. As an example, the second terminals can also transmit the weather query request to an upper-level server of the regional server according to different area granularities, and the upper-level server includes another server corresponding to an upper-level area of the particular area. As another example, the second terminals transmit the weather query request to a particular server corresponding to a street where the second terminals are located, or to a server corresponding to a city where the street is located.

In one embodiment, during the process 303, when receiving the weather forecasting information transmitted by the server, the second terminals display the weather forecasting information to a user. For example, when receiving the weather forecasting information transmitted by the server, the second terminals display the weather forecasting information according to the weather display manner supported by the second terminals. In another example, the second terminals transmit the weather query request to the server to acquire the current weather forecasting information of the area where the second terminals are located in real time. In yet another example, the weather query coverage rate is increased, and the weather query timeliness and accuracy are improved.

In another embodiment, before the process 301, the method 300 further includes at least sub-processes 300a and 300b. For example, during the sub-process 300a, the second terminals receive environmental information transmitted by the first terminals, where the environmental information includes the geographic location information of the first terminals, and the weather data corresponding to the geographic location information. In another example, during the sub-process 300b, the second terminals transmit the environmental information to the server to enable the server to acquire the weather forecasting information of the area within the designated scope corresponding to the geographic locations corresponding to the one or more first terminals according to the weather data corresponding to the one or more first terminals and the preset weather forecasting algorithm, where the geographic locations corresponding to one or more first terminals are located in the area. As another example, the second terminals can receive the environmental information transmitted by the first terminals, and transmit the environmental information to the server to enable the server to determine the weather forecasting information of the area within the designated scope associated with the geographic locations of the one or more first terminals according to the weather data corresponding to the one or more first terminals.

In yet another embodiment, the process 303 includes a sub-process 303a or a sub-process 303b. For example, during the sub-process 303a, when receiving the weather forecasting information, the second terminals display the weather forecasting information. As an example, when the second terminals receive the weather forecasting information, the weather forecasting information is displayed on a display screen of the second terminals. As another example, when receiving the weather forecasting information, the second terminals display text information in the weather forecasting information, and display image information in the weather forecasting information when receiving an image display instruction.

In yet another embodiment, during the sub-process 303b, when receiving the weather forecasting information, the second terminals broadcast voice data for prompting the weather forecasting information. For example, when receiving the weather forecasting information, the second terminals may identify the weather forecasting information, convert the weather forecasting information into the voice data for prompting the weather forecasting information, and broadcast the voice data for prompting the weather forecasting information through a loudspeaker.

Figure 4:
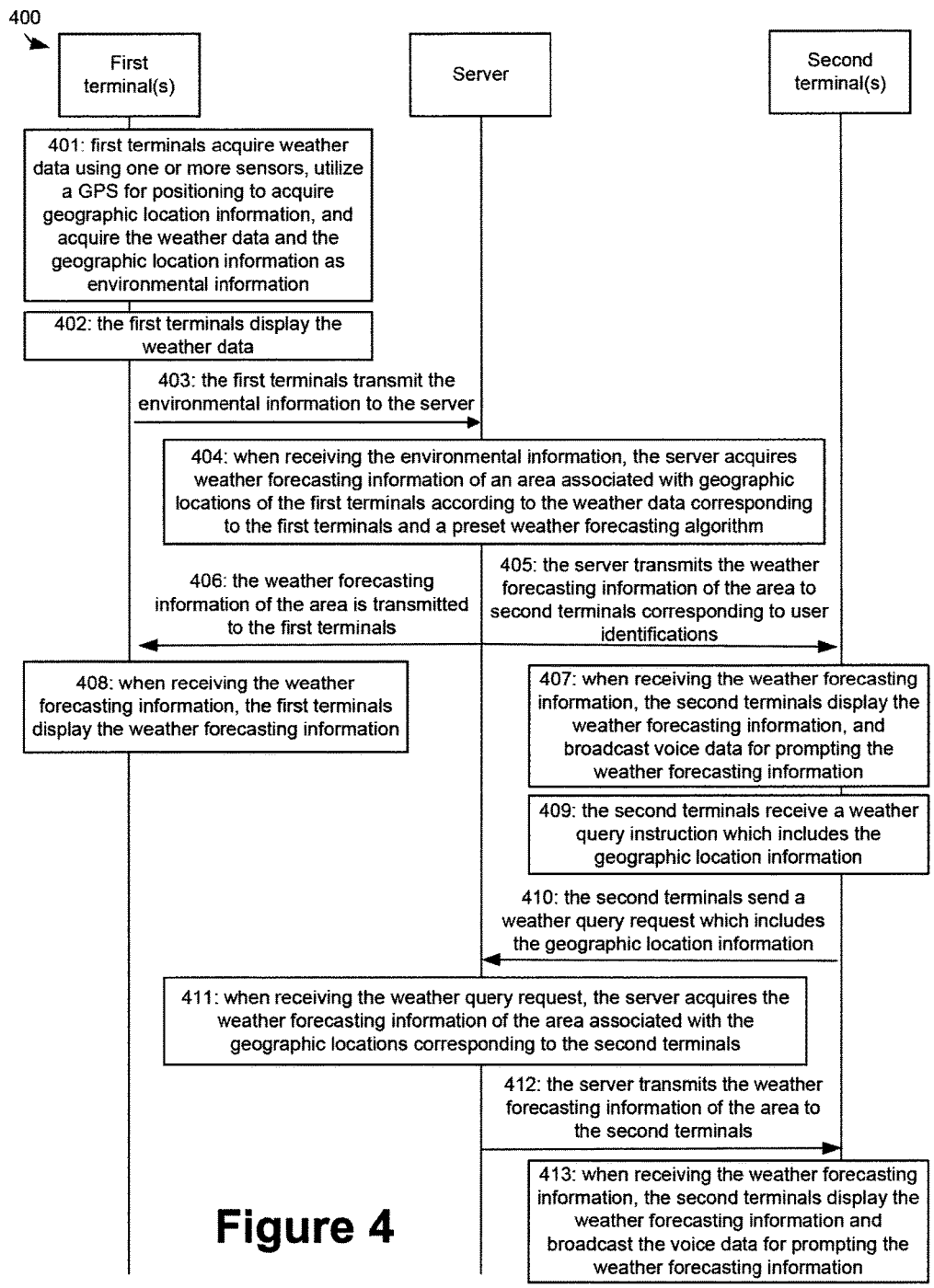
FIG. 4 is a simplified diagram showing a method for weather forecasting according to yet another embodiment of the present invention.

FIG. 4 is a simplified diagram showing a method for weather forecasting according to yet another embodiment of the present invention. The diagram is merely an example, which should not unduly limit the scope of the claims. One of ordinary skill in the art would recognize many variations, alternatives, and modifications. The method 400 includes at least processes 401-413.

According to one embodiment, during the process 401, one or more first terminals acquire weather data using one or more sensors, utilize a GPS for positioning to acquire geographic location information, and acquire the weather data and the geographic location information as environmental information. Then, the processes 402 and 403 are executed, for example. As an example, the environmental information includes the weather data and the geographic location information.

According to another embodiment, during the process 402, the first terminals display the weather data. For example, the weather data can be displayed on the first terminals in order to enable one or more users of the first terminals to see the current weather visually. In another example, the first terminals may not display the weather data, and may simply acquire and transmit the weather data. As an example, during the process 403, the first terminals transmit the environmental information to the server. As another example, the first terminals transmit the environmental information to the server directly.

According to yet another embodiment, during the process 404, when receiving the environmental information, the server acquires weather forecasting information of an area within a designated scope associated with one or more geographic locations of the one or more first terminals according to the weather data corresponding to the one or more first terminals and a preset weather forecasting algorithm. For example, the geographic locations corresponding to the first terminals are located in the area. The processes 405 and 406 are then executed, as an example.

In one embodiment, during the process 405, the server transmits the weather forecasting information of the area to one or more second terminals corresponding to one or more user identifications according to a corresponding relation between the area and the one or more user identifications. Then, the process 407 is executed, for example. In another embodiment, during the process 406, the weather forecasting information of the area is transmitted to the first terminals according to the corresponding relation between the area and one or more terminal identifications. Then, the process 408 is executed, for example. As an example, the server transmits the weather forecasting information of the area corresponding to the geographic locations to the second terminals and the first terminals. When the server saves only one of the above corresponding relations, the weather forecasting information is transmitted according to the saved corresponding relation, according to certain embodiments.

In yet another embodiment, during the process 407, when receiving the weather forecasting information, the second terminals display the weather forecasting information, and broadcast voice data for prompting the weather forecasting information at the same time. For example, the second terminals display the weather forecasting information and broadcast the voice data for prompting the weather forecasting information to display the weather forecasting information to one or more users. In another example, the users of the second terminals may select a weather forecasting information reminder to set to display and/or broadcast the weather forecasting information.

According to one embodiment, during the process 408, when receiving the weather forecasting information, the first terminals display the weather forecasting information. For example, the first terminals display the weather forecasting information to display the weather forecasting information to the users. As an example, during the process 409, the second terminals receive a weather query instruction which includes the geographic location information. As another example, during the process 410, the second terminals send a weather query request which includes the geographic location information. As yet another example, during the process 411, when receiving the weather query request, the server acquires the weather forecasting information of the area within the designated scope associated with the geographic locations of the second terminals. As yet another example, during the process 412, the server transmits the weather forecasting information of the area to the second terminals. As yet another example, during the process 413, when receiving the weather forecasting information, the second terminals display the weather forecasting information and broadcast the voice data for prompting the weather forecasting information at the same time.

According to certain embodiments, the first terminals acquire the environmental information, and a task of acquiring the environmental information is assigned by a crowd sourcing manner so that the labor cost for the weather forecasting is reduced, the device cost is apportioned, the acquisition coverage rate of the environmental information is increased at the same time. For example, the timeliness of the weather forecasting and the weather forecasting accuracy rate are improved.

Figure 5:
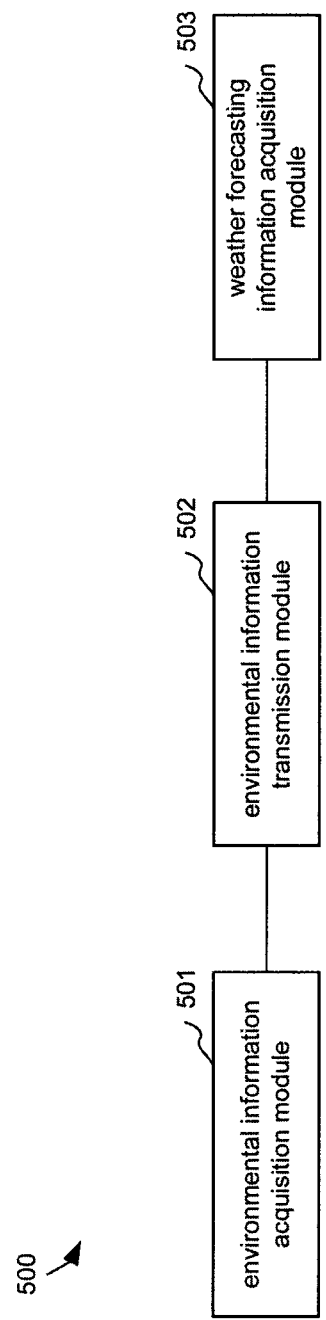
FIG. 5 is a simplified diagram showing a terminal for weather forecasting according to one embodiment of the present invention.

FIG. 5 is a simplified diagram showing a terminal for weather forecasting according to one embodiment of the present invention. The diagram is merely an example, which should not unduly limit the scope of the claims. One of ordinary skill in the art would recognize many variations, alternatives, and modifications. The terminal 500 includes an environmental information acquisition module 501, an environmental information transmission module 502 and a weather forecasting information acquisition module 503.

According to one embodiment, the environmental information acquisition module 501 is configured to acquire environmental information corresponding to the terminal 500. For example, the environmental information includes geographic location information and weather data corresponding to the geographic location information. As an example, the environmental information transmission module 502 is connected with the environmental information acquisition module 501 and configured to transmit the environmental information to a server to enable the server to acquire weather forecasting information of an area within a designated scope corresponding to a geographic location corresponding to the terminal 500 according to the received weather data corresponding to the terminal 500. In another example, the geographic location corresponding to the terminal 500 is located in the area. In yet another example, the weather forecasting information acquisition module 503 is connected with the environmental information transmission module 502 and configured to acquire the weather forecasting information of the area transmitted by the server.

According to another embodiment, the environmental information acquisition module 501 includes: an information uploading unit configured to upload the environmental information to the server. For example, the environmental information acquisition module 501 includes: an information transmitting unit configured to transmit the environmental information to one or more second terminals through a data connection with the second terminals to enable the second terminals to transmit the environmental information to the server.

According to yet another embodiment, the weather forecasting information acquisition module 503 includes: a first acquisition unit configured to acquire the weather forecasting information of the area transmitted by the server to the terminal 500. For example, the weather forecasting information acquisition module 503 includes: a second acquisition unit configured to acquire the weather forecasting information of the area transmitted by the server and forwarded by the second terminals. As an example, the area within the designated scope corresponding to the geographic location of the terminal is preset by the server, or defined by the server based on at least information associated with the received geographic location information of the terminal, and the geographic location of the terminal belongs to the area. As another example, the weather data includes: atmospheric temperature, atmospheric humidity, atmospheric particle concentration, etc.

Figure 6:
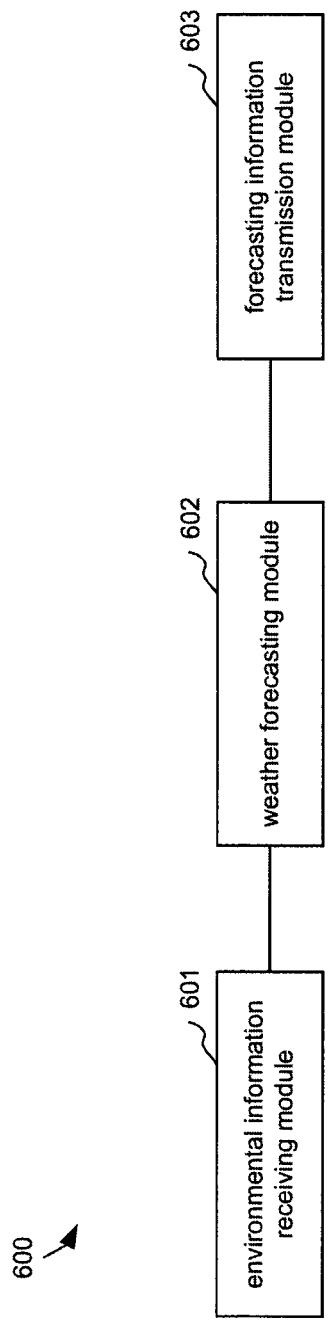
FIG. 6 is a simplified diagram showing a server for weather forecasting according to one embodiment of the present invention.

FIG. 6 is a simplified diagram showing a server for weather forecasting according to one embodiment of the present invention. The diagram is merely an example, which should not unduly limit the scope of the claims. One of ordinary skill in the art would recognize many variations, alternatives, and modifications. The server 600 includes an environmental information receiving module 601, a weather forecasting module 602 and a forecasting information transmission module 603.

According to one embodiment, the environmental information receiving module 601 is configured to receive environmental information corresponding to one or more first terminals. For example, the environmental information includes geographic location information of the one or more first terminals and weather data corresponding to the geographic location information. As an example, the weather forecasting module 602 is connected with the environmental information receiving module 601 and configured to acquire weather forecasting information of an area within a designated scope associated with one or more geographic locations corresponding to the first terminals according to the weather data corresponding to the first terminals and a preset weather forecasting algorithm. As another example, the geographic locations corresponding to the first terminals are located in the area. As yet another example, the forecasting information transmission module 603 is connected with the weather forecasting module 602 and configured to transmit the weather forecasting information of the area to the first terminals.

According to another embodiment, the environmental information receiving module 601 is configured to receive the environmental information corresponding to the first terminals and forwarded by one or more second terminals. For example, the forecasting information transmission module 603 is further configured to transmit the weather forecasting information of the area to the first terminals corresponding to one or more terminal identifications according to a corresponding relation between the area and the terminal identifications.

According to yet another embodiment, the server 600 further includes: a second transmission module configured to transmit the weather forecasting information of the area to the second terminals corresponding to one or more user identifications according to a corresponding relation between the area and the one or more user identifications.

Figure 7:
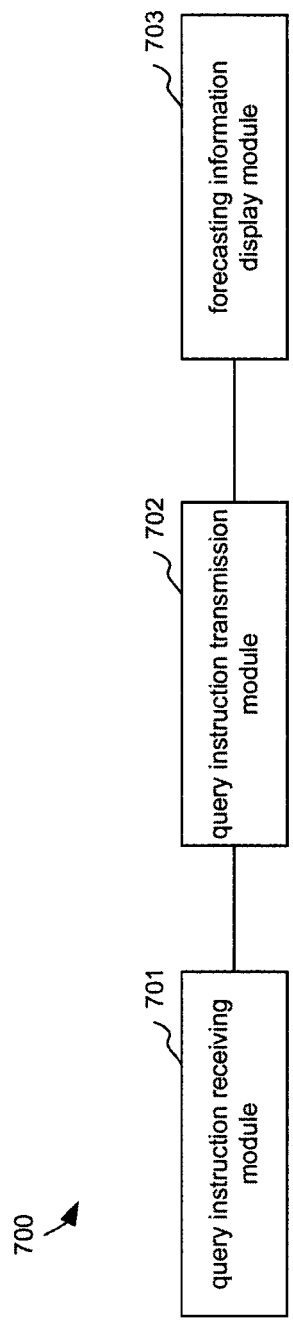
FIG. 7 is a simplified diagram showing a terminal for weather forecasting according to another embodiment of the present invention.

FIG. 7 is a simplified diagram showing a terminal for weather forecasting according to another embodiment of the present invention. The diagram is merely an example, which should not unduly limit the scope of the claims. One of ordinary skill in the art would recognize many variations, alternatives, and modifications. The terminal 700 includes a query instruction receiving module 701, a query request transmission module 702 and a forecasting information display module 703.

According to one embodiment, the query instruction receiving module 701 is configured to receive a weather query instruction which includes geographic location information. For example, the query request transmission module 702 is connected with the query instruction receiving module 701 and configured to transmit a weather query request to a server. As an example, the weather query request includes the geographic location information. As another example, the server acquires weather forecasting information of an area within a designated scope corresponding to one or more geographic locations corresponding to one or more first terminals according to weather data corresponding to the first terminals and a preset weather forecasting algorithm. As another example, the server transmits the weather forecasting information of a particular area associated with one or more geographic locations of one or more second terminals. As yet another example, the forecasting information display module 703 is connected with the query request transmission module 702 and configured to display the weather forecasting information to a user when receiving the weather forecasting information transmitted by the server.

According to another embodiment, the terminal 700 further includes: an environmental information receiving module configured to receive environmental information transmitted by the first terminals, where the environmental information includes the geographic location information of the first terminals and the weather data corresponding to the geographic location information. For example, the terminal 700 further includes: an environmental information transmission module configured to transmit the environmental information to the server to enable the server to acquire the weather forecasting information of the area associated with the geographic locations of the one or more first terminals according to the weather data corresponding to the first terminals and the preset weather forecasting algorithm. In another example, the geographic locations corresponding to one or more first terminals are located in the area.

According to yet another embodiment, the forecasting information display module 703 includes: a display unit configured to display the weather forecasting information when receiving the weather forecasting information; and/or, a broadcasting unit configured to broadcast voice data for prompting the weather forecasting information when receiving the weather forecasting information.

Figure 8:
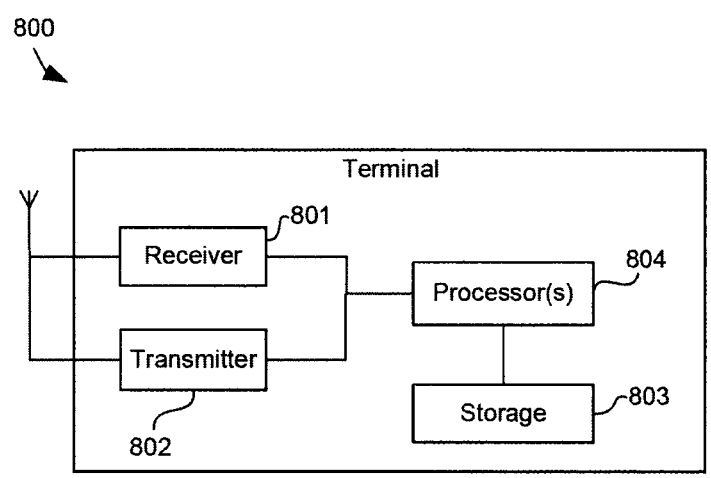
FIG. 8 is a simplified diagram showing a terminal for weather forecasting according to yet another embodiment of the present invention.

FIG. 8 is a simplified diagram showing a terminal for weather forecasting according to yet another embodiment of the present invention. The diagram is merely an example, which should not unduly limit the scope of the claims. One of ordinary skill in the art would recognize many variations, alternatives, and modifications. The terminal 800 includes: a receiver 801, a transmitter 802, a storage 803 and one or more processors 804.

According to one embodiment, the receiver 801, the transmitter 802 and the storage 803 (e.g., a memory) are connected with the processors 804 respectively. For example, the storage 803 saves a program code, and the processors 804 are configured to call the program code to perform certain operations. As an example, the operations include: acquiring environmental information corresponding to one or more terminals through the receiver 801, where the environmental information includes geographic location information, and weather data corresponding to the geographic location information; transmitting the environmental information to a server through the transmitter 802 to enable the server to acquire weather forecasting information of an area within a designated scope corresponding to one or more geographic locations corresponding to the terminals according to the received weather data corresponding to the terminals, where the geographic locations corresponding to the terminals are located in the area; acquiring the weather forecasting information of the area transmitted by the server through the receiver 801.

According to another embodiment, the processors 804 are further configured to call the program code to perform certain operations. For example, one or more first terminals upload the environmental information to the server. In another example, the first terminals transmit the environmental information to one or more second terminals through a data connection with the second terminals to enable the second terminals to transmit the environmental information to the server.

According to yet another embodiment, the processors 804 are further configured to call the program code to perform certain operations. For example, the first terminals acquire the weather forecasting information of the area transmitted by the server to the first terminals. In another example, the first terminals acquire the weather forecasting information of the area transmitted by the server and forwarded by the second terminals. In yet another example, the area within the designated scope corresponding to the geographic locations of the first terminals are preset by the server, or defined by the server according to the received geographic location information of all the first terminals, and the geographic locations of the first terminals belong to the area. In yet another example, the weather data includes: atmospheric temperature, atmospheric humidity, atmospheric particle concentration, etc.

Figure 9:
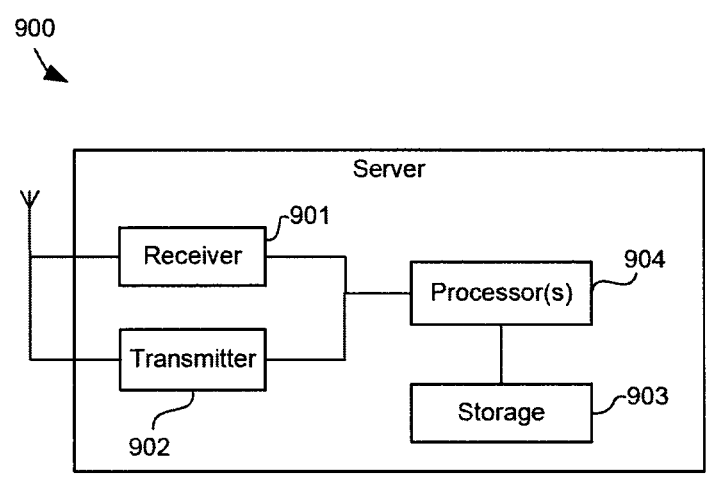
FIG. 9 is a simplified diagram showing a server for weather forecasting according to another embodiment of the present invention.

FIG. 9 is a simplified diagram showing a server for weather forecasting according to another embodiment of the present invention. The diagram is merely an example, which should not unduly limit the scope of the claims. One of ordinary skill in the art would recognize many variations, alternatives, and modifications. The server 900 includes: a receiver 901, a transmitter 902, a storage 903 and one or more processors 904.

According to one embodiment, the receiver 901, the transmitter 902 and the storage 903 (e.g., a memory) are connected with the processors 904 respectively. For example, the storage 903 saves a program code, and the processors 904 are configured to call the program code to perform certain operations including: acquiring environmental information corresponding to one or more first terminals through the receiver 901, where the environmental information includes geographic location information of the first terminals, and weather data corresponding to the geographic location information; acquiring weather forecasting information of an area within a designated scope corresponding to one or more geographic locations corresponding to the first terminals according to the weather data corresponding to the first terminals and a preset weather forecasting algorithm, where the geographic location corresponding to one or more first terminals are located in the area; and transmitting the weather forecasting information of the area to the first terminals through the transmitter 902.

According to another embodiment, the processors 904 are further configured to call the program code to perform certain operations. For example, the server receives the environmental information corresponding to the first terminals and forwarded by one or more second terminals. According to yet another embodiment, the processors 904 are further configured to call the program code to perform certain operation. As an example, the server transmits the weather forecasting information of the area to the first terminals corresponding to one or more terminal identifications according to a corresponding relation between the area and the terminal identifications.

According to yet another example, the processors 904 are further configured to call the program code to perform certain operation. For example, the server transmits the weather forecasting information of the area to the second terminals corresponding to one or more user identifications according to a corresponding relation between the area and the one or more user identifications.

Figure 10:
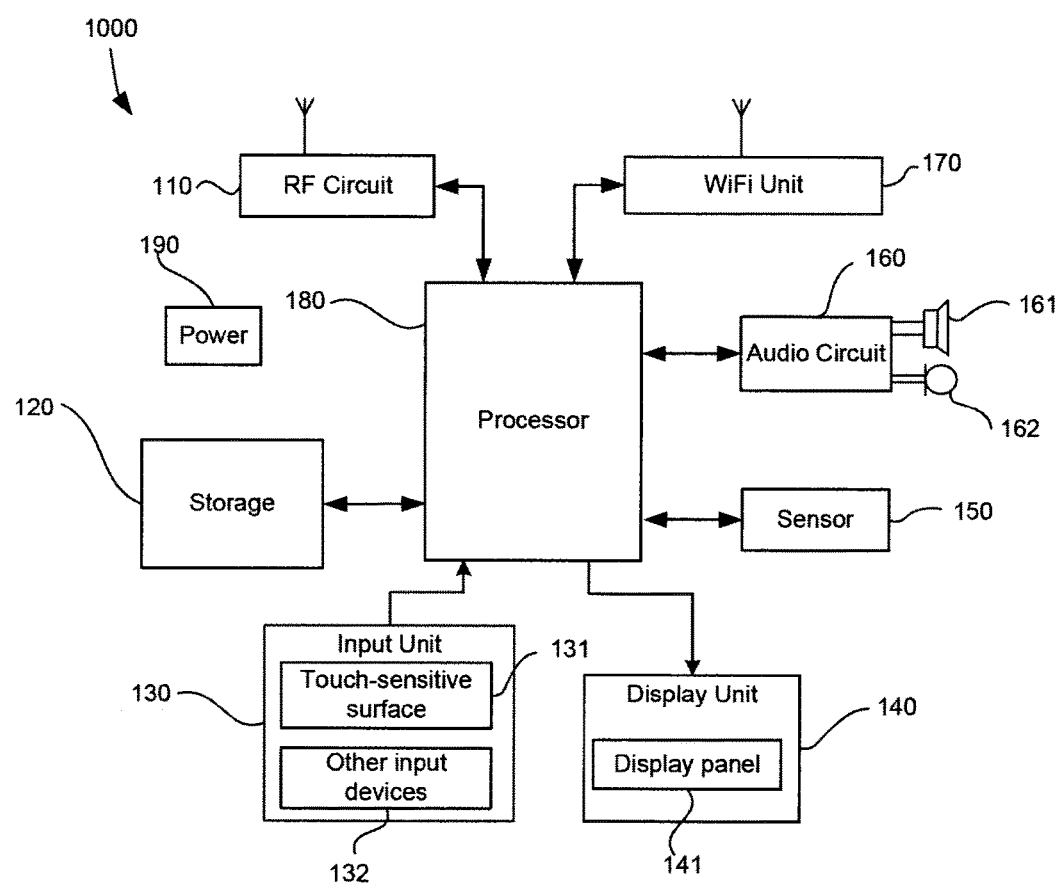
FIG. 10 is a simplified diagram showing a terminal for weather forecasting according to yet another embodiment of the present invention.

FIG. 10 is a simplified diagram showing a terminal for weather forecasting according to yet another embodiment of the present invention. The diagram is merely an example, which should not unduly limit the scope of the claims. One of ordinary skill in the art would recognize many variations, alternatives, and modifications.

According to one embodiment, the terminal 1000 (e.g., a mobile phone) includes a RF (i.e., radio frequency) circuit 110, a memory 120 (e.g., including one or more computer-readable storage media), an input unit 130, a display unit 140, a sensor 150, an audio circuit 160, a wireless communication module 170, one or more processors 180 that includes one or more processing cores, and a power supply 190. For example, the RF circuit 110 is configured to send/receive messages or signals in communication. As an example, the RF circuit 110 receives a base station's downlink information, delivers to the processors 180 for processing, and sends uplink data to the base station. For example, the RF circuit 110 includes an antenna, at least one amplifier, a timer, one or several oscillators, SIM (Subscriber Identity Module) card, a transceiver, a coupler, an LNA (Low Noise Amplifier) and/or a duplexer. In another example, the RF circuit 110 communicates with the network and other equipments via wireless communication based on any communication standard or protocols, such as GSM (Global System of Mobile communication), GPRS (General Packet Radio Service), CDMA (Code Division Multiple Access), WCDMA (Wideband Code Division Multiple Access), LTE (Long Term Evolution), email, SMS (Short Messaging Service), etc.

According to another embodiment, the memory 120 is configured to store software programs and modules. For example, the processors 180 are configured to execute various functional applications and data processing by running the software programs and modules stored in the memory 120. The memory 120 includes a program storage area and a data storage area, where the program storage area may store the operating system, and the application(s) required by one or more functions (e.g., an audio player or a video player), in some embodiments. For example, the data storage area stores the data created based on the use of the terminal 1000 (e.g., audio data or a phone book). In another example, the memory 120 includes a high-speed random access storage, a non-volatile memory, one or more floppy disc storage devices, a flash storage device or other volatile solid storage devices. As an example, the memory 120 further includes a memory controller to enable access to the memory 120 by the processors 180 and the input unit 130.

According to yet another embodiment, the input unit 130 is configured to receive an input number or character data and generate inputs for a keyboard, a mouse, and a joystick, optical or track signals relating to user setting and functional control. For example, the input unit 130 includes a touch-sensitive surface 131 and other input devices 132. The touch-sensitive surface 131 (e.g., a touch screen or a touch panel) is configured to receive the user's touch operations thereon or nearby (e.g., the user's operations on or near the touch-sensitive surface with a finger, a touch pen or any other appropriate object or attachment) and drive the corresponding connected devices according to the predetermined program. For example, the touch-sensitive surface 131 includes two parts, namely a touch detector and a touch controller. The touch detector detects the position of user touch and the signals arising from such touches and sends the signals to the touch controller. The touch controller receives touch data from the touch detector, converts the touch data into the coordinates of the touch point, sends the coordinates to the processors 180 and receives and executes the commands received from the processors 180. For example, the touch-sensitive surface 131 is of a resistance type, a capacitance type, an infrared type and a surface acoustic wave type. In another example, other than the touch-sensitive surface, the input unit 130 includes the other input devices 132. For example, the other input devices 132 include one or more physical keyboards, one or more functional keys (e.g., volume control keys or switch keys), a track ball, a mouse and/or a joystick.

According to yet another embodiment, the display unit 140 is configured to display data input from a user or provided to the user, and includes various graphical user interfaces of the terminal 1000. For example, these graphical user interfaces include menus, graphs, texts, icons, videos and a combination thereof. The display unit 140 includes a display panel 141 which contains a LCD (liquid crystal display), an OLED (organic light-emitting diode). As an example, the touch-sensitive surface can cover the display panel 141. For example, upon detecting any touch operations thereon or nearby, the touch-sensitive surface sends signals to the processors 180 to determine the type of the touch events and then the processors 180 provides corresponding visual outputs on the display panel 141 according to the type of the touch events. Although the touch-sensitive surface 131 and the display panel 141 are two independent parts for input and output respectively, the touch-sensitive surface 131 and the display panel 141 can be integrated for input and output, in some embodiments.

In one embodiment, the terminal 1000 includes a sensor 150 (e.g., an optical sensor, a motion sensor or other sensors). For example, the sensor 150 includes an environment optical sensor and adjusts the brightness of the display panel 141 according to the environmental luminance. In another example, the sensor 150 includes a proximity sensor and turns off or backlights the display panel when the terminal 1000 moves close to an ear of a user. In yet another example, the sensor 150 includes a motion sensor (e.g., a gravity acceleration sensor) and detects a magnitude of acceleration in all directions (e.g., three axes). Particularly, the sensor 150 detects a magnitude and a direction of gravity when staying still. In some embodiments, the sensor 150 is used for identifying movements of a cell phone (e.g., a switch of screen direction between horizontal and vertical, related games, and a calibration related to a magnetometer) and features related to vibration identification (e.g., a pedometer or a strike). In certain embodiments, the sensor 150 includes a gyroscope, a barometer, a hygroscope, a thermometer and/or an infrared sensor.

In another embodiment, the audio circuit 160, a speaker 161, and a microphone 162 are configured to provide an audio interface between a user and the terminal 1000. For example, the audio circuit 160 is configured to transmit electrical signals converted from certain audio data to the speaker that converts such electrical signals into some output audio signals. In another example, the microphone 162 is configured to convert audio signals into electrical signals which are converted into audio data by the audio circuit 160. The audio data are processed in the processors 180 and received by the RF circuit 110 before being sent to another terminal, in some embodiments. For example, the audio data are output to the memory 120 for further processing. As an example, the audio circuit 160 includes an earphone jack for communication between a peripheral earphone and the terminal 1000.

According to some embodiments, the wireless communication module 170 includes a WiFi (e.g., wireless fidelity, a short-distance wireless transmission technology) module, a Bluetooth module, an infrared communication module, etc. In some embodiments, through the wireless communication module 170, the terminal 1000 enables the user to receive and send emails, browse webpages, and/or access stream media. For example, the terminal 1000 is configured to provide the user with a wireless broadband Internet access.

In some embodiments, the wireless communication module 170 is omitted in the terminal 1000.

According to one embodiment, the processors 180 are the control center of the terminal 1000. For example, the processors 180 is connected to various parts of the terminal 1000 (e.g., a cell phone) via various interfaces and circuits, and executes various features of the terminal 1000 and processes various data through operating or executing the software programs and/or modules stored in the memory 120 and calling the data stored in the memory 120, so as to monitor and control the terminal 1000 (e.g., a cell phone). As an example, the processors 180 include one or more processing cores. In another example, the processors 180 is integrated with an application processor and a modem processor, where the application processor mainly handles the operating system, the user interface and the applications and the modem processor mainly handles wireless communications. In some embodiments, the modem processor is not integrated into the processors 180.

According to another embodiment, the terminal 1000 includes the power supply 190 (e.g., a battery) that powers up various parts. For example, the power supply 190 is logically connected to the processors 180 via a power source management system so that the charging, discharging and power consumption can be managed via the power source management system. In another example, the power supply 190 includes one or more DC or AC power sources, a recharging system, a power-failure-detection circuit, a power converter, an inverter, a power source state indicator, or other components. In yet another example, the terminal 1000 includes a camcorder, a Bluetooth module, etc. According to some embodiments, the processors 180 of the terminal 1000 load executable files/codes associated with one or more applications to the memory 120 and run the applications stored in the memory 120 according to the method 100 as shown in FIG. 1(A), the method 300 as shown in FIG. 3, and/or the method 400 as shown in FIG. 4.

Figure 11:
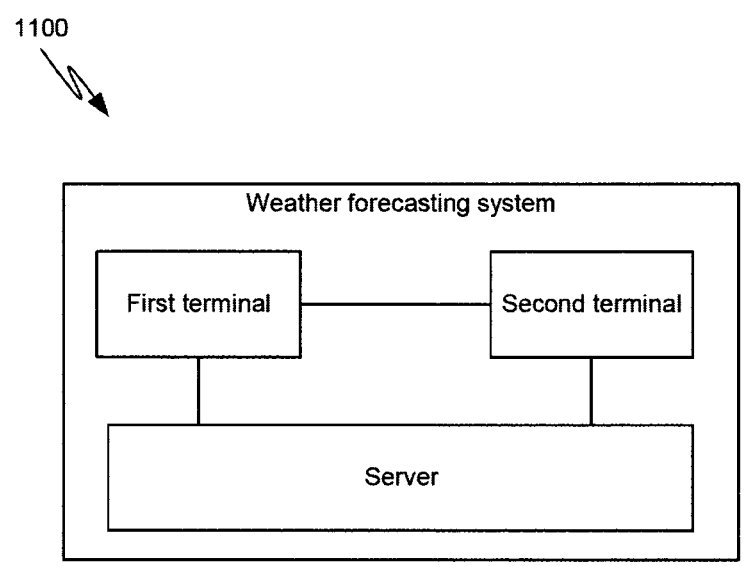
FIG. 11 is a simplified diagram showing a system for weather forecasting according to one embodiment of the present invention.

FIG. 11 is a simplified diagram showing a system for weather forecasting according to one embodiment of the present invention. The diagram is merely an example, which should not unduly limit the scope of the claims. One of ordinary skill in the art would recognize many variations, alternatives, and modifications. The system 1100 includes one or more first terminals, a server and one or more second terminals.

According to one embodiment, the first terminals are configured to acquire environmental information corresponding to the first terminals, transmit the environmental information to the server, and acquire weather forecasting information of an area transmitted by the server, wherein the environmental information includes geographic location information of the first terminals, and weather data corresponding to the geographic location information. For example, the server is configured to receive the environmental information corresponding to the one or more first terminals, acquire the weather forecasting information of the area within a designated scope corresponding to one or more geographic locations corresponding to the first terminals according to the weather data corresponding to the first terminals and a preset weather forecasting algorithm, and transmit the weather forecasting information of the area to the first terminals, wherein the environmental information includes the geographic location information of the first terminals, and the weather data corresponding to the geographic location information. In another example, the second terminals are configured to receive a weather query instruction, transmit a weather query request to the server, and display the weather forecasting information to a user when receiving the weather forecasting information transmitted by the server, wherein the weather query instruction includes the geographic location information, and the weather query request includes the geographic location information.

The first terminals are configured to execute the method 100 as shown in FIG. 1(A) and/or the method 400 as shown in FIG. 4, according to certain embodiments. For example, the server is configured to execute the method 200 as shown in FIG. 2(A) and/or the method 400 as shown in FIG. 4. In another example, the second terminals are configured to execute the method 300 as shown in FIG. 3 and/or the method 400 as shown in FIG. 4.

According to one embodiment, a method is provided for weather forecasting. For example, one or more first terminals acquire environmental information corresponding to the first terminals; wherein the environmental information includes geographic location information of the first terminals and weather data corresponding to the geographic location information; the first terminals transmit the environmental information to a server so that the server acquires weather forecasting information of an area corresponding to one or more geographic locations of the first terminals based on at least information associated with the weather data corresponding to the first terminals; wherein the geographic locations corresponding to the first terminals are within the area; and the first terminals acquire the weather forecasting information of the area transmitted by the server. For example, the method is implemented according to at least FIG. 1(A) and/or FIG. 4.

According to another embodiment, a method is provided for weather forecasting. For example, a server receives environmental information corresponding to one or more first terminals; wherein the environmental information includes geographic location information of the first terminals and weather data corresponding to the geographic location information; the server acquires weather forecasting information of an area corresponding to one or more geographic locations of the first terminals based on at least information associated with the weather data corresponding to the first terminals; wherein the geographic locations corresponding to the first terminals are within the area; and the server transmits the weather forecasting information of the area to the first terminals. For example, the method is implemented according to at least FIG. 2(A) and/or FIG. 4.

According to yet another embodiment, a method is provided for weather forecasting. For example, one or more second terminals receive a weather query instruction including first geographic location information; and the second terminals transmit a weather query request to a server so that the server provides weather forecasting information to the second terminals, the weather forecasting information being acquired according to weather data of one or more first terminals; and the second terminals display the weather forecasting information to a user upon receiving the weather forecasting information transmitted by the server. The weather query request includes the first geographic location information. Second geographic location information of the second terminals and third geographic location information of the first terminals are within an area. For example, the method is implemented according to at least FIG. 3 and/or FIG. 4.

In one embodiment, a terminal includes: an environmental information acquisition module configured to acquire environmental information corresponding to the terminal;

wherein the environmental information includes geographic location information of the terminal and weather data corresponding to the geographic location information; an environmental information transmission module configured to transmit the environmental information to a server so that the server acquires weather forecasting information of an area corresponding to a geographic location of the terminal based on at least information associated with the weather data corresponding to the terminal; wherein the geographic location corresponding to the terminal is within the area; and a weather forecasting information acquisition module configured to acquire the weather forecasting information of the area transmitted by the server. For example, the terminal is implemented according to at least FIG. 5, FIG. 8, FIG. 10, and/or FIG. 11.

In another embodiment, a server includes: an environmental information receiving module configured to receive environmental information corresponding to one or more first terminals; wherein the environmental information includes geographic location information of the first terminals and weather data corresponding to the geographic location information; a weather forecasting module configured to acquire weather forecasting information of an area corresponding to one or more geographic locations of the first terminals based on at least information associated with the weather data corresponding to the first terminals; wherein the geographic locations corresponding to the first terminals are within the area; and a forecasting information transmission module configured to transmit the weather forecasting information of the area to the first terminals. For example, the server is implemented according to at least FIG. 6, FIG. 9, FIG. 10, and/or FIG. 11.

In yet another embodiment, a terminal includes: a query instruction receiving module configured to receive a weather query instruction including first geographic location information; a query instruction transmission module configured to transmit a weather query request to a server so that the server provides weather forecasting information to the terminal, the weather forecasting information being acquired according to weather data of one or more first terminals; and a forecasting information display module configured to display the weather forecasting information to a user upon receiving the weather forecasting information transmitted by the server. The weather query request includes second geographic location information of the terminal and third geographic location information of the first terminals. The second geographic location information of the terminal and the third geographic location information of the first terminals are within an area. For example, the terminal is implemented according to at least FIG. 7, FIG. 8, FIG. 10, and/or FIG. 11.

According to one embodiment, a weather forecasting system includes: one or more first terminals; a server; and one or more second terminals. The first terminals are configured to acquire environmental information corresponding to the first terminals, transmit the environmental information to the server, and acquire the weather forecasting information of the area transmitted by the server, the environmental information including first geographic location information of the first terminals and weather data corresponding to the first geographic location information. The server is configured to receive the environmental information corresponding to the first terminals, acquire the weather forecasting information of the area corresponding to one or more geographic locations of the first terminals based on at least information associated with the weather data corresponding to the first terminals, and transmit the weather forecasting information of the area to the first terminals. The second terminals are configured to receive a weather query instruction including second geographic location information, transmit a weather query request to the server, and display the weather forecasting information to a user upon receiving the weather forecasting information transmitted by the server, the weather query request including the second geographic location information. For example, the system is implemented according to at least FIG. 11.

According to another embodiment, a non-transitory computer readable storage medium includes programming instructions for weather forecasting. The programming instructions are configured to cause one or more data processors to execute certain operations. For example, one or more first terminals acquire environmental information corresponding to the first terminals; wherein the environmental information includes geographic location information of the first terminals and weather data corresponding to the geographic location information; the first terminals transmit the environmental information to a server so that the server acquires weather forecasting information of an area corresponding to one or more geographic locations of the first terminals based on at least information associated with the weather data corresponding to the first terminals; wherein the geographic locations corresponding to the first terminals are within the area; and the first terminals acquire the weather forecasting information of the area transmitted by the server. For example, the storage medium is implemented according to at least FIG. 1(A) and/or FIG. 4.

According to yet another embodiment, a non-transitory computer readable storage medium includes programming instructions for weather forecasting. The programming instructions are configured to cause one or more data processors to execute certain operations. For example, a server receives environmental information corresponding to one or more first terminals; wherein the environmental information includes geographic location information of the first terminals and weather data corresponding to the geographic location information; the server acquires weather forecasting information of an area corresponding to one or more geographic locations of the first terminals based on at least information associated with the weather data corresponding to the first terminals; wherein the geographic locations corresponding to the first terminals are within the area; and the server transmits the weather forecasting information of the area to the first terminals. For example, the storage medium is implemented according to at least FIG. 2(A) and/or FIG. 4.

According to yet another embodiment, a non-transitory computer readable storage medium includes programming instructions for weather forecasting. The programming instructions are configured to cause one or more data processors to execute certain operations. For example, one or more second terminals receive a weather query instruction including first geographic location information; and the second terminals transmit a weather query request to a server so that the server provides weather forecasting information to the second terminals, the weather forecasting information being acquired according to weather data of one or more first terminals; and the second terminals display the weather forecasting information to a user upon receiving the weather forecasting information transmitted by the server. The weather query request includes the first geographic location information. Second geographic location information of the second terminals and third geographic location information of the first terminals are within an area. For example, the storage medium is implemented according to at least FIG. 3 and/or FIG. 4.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A weather forecasting method comprising:
   acquiring, by one or more first terminals, environmental information corresponding to the first terminals;
   wherein each terminal of the one or more first terminals includes one or more sensors, the environmental information includes one or more geographic locations of the first terminals and weather data corresponding to the one or more geographic locations, and the acquiring environmental information includes measuring, by the one or more sensors, environmental data;
   detecting, by at least one sensor of the one or more sensors, periodically a current geographic location of at least one terminal of the one or more first terminals, the current geographic location including a longitude coordinate and a latitude coordinate;
   in response to detecting the current geographic location of the at least one terminal, displaying text information associated with the longitude coordinate and the latitude coordinate or a map labelled with the current geographic location on a display of the at least one terminal;
   transmitting, by the one or more first terminals, the environmental information to a server so that the server determines weather forecasting information of an area, the area corresponding to the one or more geographic locations of the first terminals within a designated scope, and the weather forecasting information being based on at least information associated with the weather data corresponding to the first terminals;

wherein at least one of the geographic locations corresponding to the one or more first terminals is within the area;

acquiring, by the one or more first terminals, the weather forecasting information of the area transmitted by the server;

in response to acquiring the weather forecasting information of the area, determining whether the current geographic location of the at least one terminal of the one or more first terminals corresponds to the area of the acquired weather forecasting information; and in response to determining that the current geographic location of the at least one terminal of the one or more first terminals corresponds to the area of the acquired weather forecasting information, displaying the acquired weather forecasting information on the display of the at least one terminal;

wherein:
the area of the acquired weather forecasting information includes an area radius; and
the area radius is determined based on a distribution density of the geographic locations of the one and more first terminals such that the area radius decreases if the distribution density increases within the designated scope.

2. The method of claim 1, wherein the transmitting, by the first terminals, the environmental information to a server includes:
uploading, by the first terminals, the environmental information to the server; or
transmitting, by the first terminals, the environmental information to one or more second terminals through a data connection with the second terminals so that the second terminals transmit the environmental information to the server.

3. The method of claim 2, wherein the acquiring, by the first terminals, the weather forecasting information of the area transmitted by the server includes:
acquiring, by the first terminals, the weather forecasting information of the area transmitted to the first terminals by the server; or
acquiring, by the first terminals, the weather forecasting information of the area transmitted by the server and forwarded by the second terminals.

4. The method of claim 1, wherein:
the area is preset by the server; or
the area is defined by the server according to the received geographic locations of the first terminals, the geographic locations of the first terminals being within the area.

5. The method of claim 1, wherein the weather data includes one or more of: atmospheric temperature, atmospheric humidity and atmospheric particle concentration.

6. A weather forecasting method comprising:
receiving, by a server, environmental information corresponding to one or more first terminals that are configured to acquire the environmental information;
wherein each terminal of the one or more first terminals includes one or more sensors, the environmental information includes one or more geographic locations of the first terminals and weather data corresponding to the one or more geographic locations, and acquiring the environmental information by the one or more first terminals includes measuring, by the one or more sensors, environmental data;
wherein at least one sensor of the one or more sensors is configured to detect periodically a current geographic location of at least one terminal of the one or more first terminals, the current geographic location including a longitude coordinate and a latitude coordinate;
determining, by the server, weather forecasting information of an area, the area corresponding to the one or more geographic locations of the first terminals within a designated scope, and the weather forecasting information being based on at least information associated with the weather data corresponding to the one or more first terminals;
wherein at least one of the geographic locations corresponding to the first terminals is within the area; and
transmitting, by the server, the weather forecasting information of the area to the first terminals;
wherein the one or more first terminals are further configured to:
in response to detecting the current geographic location of the at least one terminal, display text information associated with the longitude coordinate and the latitude coordinate or a map labelled with the current geographic location on a display of the at least one terminal;
in response to acquiring the weather forecasting information of the area, determine whether the current geographic location of the at least one terminal of the one or more first terminals corresponds to the area of the acquired weather forecasting information; and
in response to determining that the current geographic location of the at least one terminal of the one or more first terminals corresponds to the area of the acquired weather forecasting information, display the acquired weather forecasting information on the display of the at least one terminal;
wherein:
the area of the acquired weather forecasting information includes an area radius; and
the area radius is determined based on a distribution density of the geographic locations of the one and more first terminals such that the area radius decreases if the distribution density increases within the designated scope.

7. The method of claim 6, wherein the receiving, by a server, environmental information corresponding to one or more first terminals includes:
receiving, by the server, the environmental information corresponding to the first terminals forwarded by one or more second terminals.

8. The method of claim 6, wherein the transmitting, by the server, the weather forecasting information of the area to the first terminals includes:
transmitting, by the server, the weather forecasting information of the area to the first terminals associated with one or more terminal identifications based on at least information associated with a corresponding relationship between the area and the terminal identifications.

9. The method of claim 6, further comprising:
transmitting, by the server, the weather forecasting information of the area to one or more second terminals associated with one or more user identifications based on at least information associated with a corresponding relationship between the area and the one or more user identifications.

10. A terminal comprising:
an environmental information acquisition module configured to acquire environmental information corresponding to the terminal;
wherein the terminal includes one or more sensors, the environmental information includes one or more geographic locations of the terminal and weather data corresponding to the one or more geographic locations, and the acquiring environmental information includes measuring, by the one or more sensors, environmental data;
wherein at least one sensor of the one or more sensors is configured to detect periodically a current geographic location of the terminal, the current geographic location including a longitude coordinate and a latitude coordinate;
an environmental information transmission module configured to transmit the environmental information to a server so that the server determines weather forecasting information of an area, the area corresponding to the one or more geographic locations of the terminal within a designated scope, and the weather forecasting information being based on at least information associated with the weather data corresponding to the terminal;
wherein at least one of the geographic locations corresponding to the terminal is within the area; and
a weather forecasting information acquisition module configured to:
in response to detecting the current geographic location of the terminal, display text information associated with the longitude coordinate and the latitude coordinate or a map labelled with the current geographic location on a display of the terminal;
acquire the weather forecasting information of the area transmitted by the server;
in response to acquiring the weather forecasting information of the area, determine whether the current geographic location of the terminal corresponds to the area of the acquired weather forecasting information; and
in response to determining that the current geographic location of the terminal corresponds to the area of the acquired weather forecasting information, display the acquired weather forecasting information on the display of the terminal;
wherein:
the area of the acquired weather forecasting information includes an area radius; and
the area radius is determined based on a distribution density of the geographic locations of the terminal and other terminals corresponding to the geographic locations such that the area radius decreases if the distribution density increases within the designated scope.

11. The terminal of claim 10, wherein the environmental information transmission module includes: an information uploading unit configured to upload the environmental information to the server.

12. The terminal of claim 10, wherein the environmental information transmission module includes: an information transmitting unit configured to transmit the environmental information to one or more second terminals through a data connection with the second terminals so that the second terminals transmit the environmental information to the server.

13. The terminal of claim 10, wherein the weather forecasting information acquisition module includes: a first acquisition unit configured to acquire the weather forecasting information of the area transmitted to the terminal by the server.

14. The terminal of claim 10, wherein the weather forecasting information acquisition module includes: a second acquisition unit configured to acquire the weather forecasting information of the area transmitted by the server and forwarded by the second terminals.

15. The terminal of claim 10, wherein:
the area is preset by the server; or
the area is defined by the server based on at least information associated with the received geographic location of the terminal, the geographic location of the terminal being within the area.

16. The terminal of claim 10, wherein the weather data includes one or more of: atmospheric temperature, atmospheric humidity and atmospheric particle concentration.

17. The terminal of claim 10, further comprising:
one or more data processors; and
a computer-readable storage medium;
wherein one or more of the environmental information acquisition module, the environmental information transmission module, and the weather forecasting information acquisition module are stored in the storage medium and configured to be executed by the one or more data processors.

18. A server comprising:
an environmental information receiving module configured to receive environmental information corresponding to one or more first terminals that are configured to acquire the environmental information;
wherein each terminal of the one or more first terminals includes one or more sensors, the environmental information includes one or more geographic locations of the first terminals and weather data corresponding to the one or more geographic locations, and acquiring the environmental information by the one or more first terminals includes measuring, by the one or more sensors, environmental data;
wherein at least one sensor of the one or more sensors is configured to detect periodically a current geographic location of at least one terminal of the one or more terminals, the current geographic location including a longitude coordinate and a latitude coordinate;
a weather forecasting module configured to determine weather forecasting information of an area, the area corresponding to the one or more geographic locations of the first terminals within a designated scope, and the weather forecasting information being based on at least information associated with the weather data corresponding to the one or more first terminals;
wherein at least one of the geographic locations corresponding to the first terminals is within the area; and
a forecasting information transmission module configured to transmit the weather forecasting information of the area to the first terminals;
wherein the one or more first terminals are further configured to:
in response to detecting the current geographic location of the at least one terminal, display text information associated with the longitude coordinate and the latitude coordinate or a map labelled with the current geographic location on a display of the at least one terminal;
in response to acquiring the weather forecasting information of the area, determine whether the current geographic location of at least one terminal of the one or more first terminals corresponds to the area of the acquired weather forecasting information; and in response to determining that the current geographic location of the at least one terminal of the one or more first terminals corresponds to the area of the acquired weather forecasting information, display the acquired weather forecasting information on the display of the at least one terminal;

wherein:

the area of the acquired weather forecasting information includes an area radius; and the area radius is determined based on a distribution density of the geographic locations of the one and more first terminals such that the area radius decreases if the distribution density increases within the designated scope.

19. The server of claim 18, wherein the environmental information receiving module is configured to receive the environmental information corresponding to the first terminals forwarded by one or more second terminals.

20. The server of claim 18, wherein the forecasting information transmission module is further configured to transmit the weather forecasting information of the area to the first terminals associated with one or more terminal identifications based on at least information associated with a corresponding relationship between the area and the terminal identifications.

21. The server of claim 18, further comprising:

a second transmission module configured to transmit the weather forecasting information of the area to one or more second terminals associated with one or more user identifications based on at least information associated with a corresponding relationship between the area and the one or more user identifications.

22. The server of claim 18, further comprising:

one or more data processors; and a computer-readable storage medium;

wherein one or more of the environmental information receiving module, the weather forecasting module, and the forecasting information transmission module are stored in the storage medium and configured to be executed by the one or more data processors.

\* \* \* \* \*